(12) United States Patent
Waugh et al.

(10) Patent No.: US 10,359,142 B2
(45) Date of Patent: Jul. 23, 2019

(54) DUAL DUCT FLEXIBLE COUPLING APPARATUS AND METHODS OF USE

(71) Applicant: THE BOEING COMPANY, Chicago, IL (US)

(72) Inventors: Gregory M. Waugh, Renton, WA (US); Ronald L. Clements, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 330 days.

(21) Appl. No.: 15/193,920

(22) Filed: Jun. 27, 2016

(65) Prior Publication Data
US 2017/0370513 A1   Dec. 28, 2017

(51) Int. Cl.
*F16L 39/00* (2006.01)
*F16L 27/02* (2006.01)
*F16L 27/12* (2006.01)

(52) U.S. Cl.
CPC .......... *F16L 39/005* (2013.01); *F16L 27/026* (2013.01); *F16L 27/12* (2013.01)

(58) Field of Classification Search
CPC ... F16L 37/565; F16L 9/18; F16L 9/19; F16L 27/125; F16L 39/005; F16L 39/04
USPC .......... 285/123.15, 123.16, 223, 236
See application file for complete search history.

(56) References Cited

U.S. PATENT DOCUMENTS

| 4,422,675 A | 12/1983 | Norris et al. | |
|---|---|---|---|
| 4,929,000 A * | 5/1990 | Annestedt, Sr. | E04F 17/02 138/148 |
| 5,011,193 A * | 4/1991 | Porte | F16L 27/12 285/123.1 |
| 9,360,144 B2 * | 6/2016 | Carns | F16L 25/01 |
| 9,885,436 B2 * | 2/2018 | Courpet | F16L 39/04 |
| 9,982,821 B1 * | 5/2018 | Scheiferstein | |
| 2004/0026922 A1 * | 2/2004 | Carns | F16L 39/005 285/123.15 |
| 2004/0207197 A1 * | 10/2004 | Hoang | F16L 39/005 285/123.15 |
| 2007/0181204 A1 | 8/2007 | Stout | |
| 2009/0091126 A1 * | 4/2009 | Carns | F16L 39/005 285/123.15 |
| 2009/0256352 A1 * | 10/2009 | Petit | F16L 39/005 285/123.15 |
| 2010/0001512 A1 * | 1/2010 | Breay | B64D 37/32 285/50 |
| 2013/0049355 A1 * | 2/2013 | Weinhold | F16L 3/1222 285/123.16 |
| 2014/0117162 A1 * | 5/2014 | Courpet | B64C 1/12 244/132 |
| 2015/0130183 A1 * | 5/2015 | Statler, III | F16L 39/005 285/123.15 |

* cited by examiner

Primary Examiner — Aaron M Dunwoody
(74) Attorney, Agent, or Firm — Coats & Bennett, PLLC

(57) ABSTRACT

A flexible dual duct coupling, comprising: a coupling body having an inner flow passage and an outer flow passage therethrough; a first nut assembly configured for reversible attachment to the coupling body; and, a second nut assembly configured for reversible attachment to the coupling body, wherein the second nut assembly is opposite the first nut assembly.

1 Claim, 15 Drawing Sheets

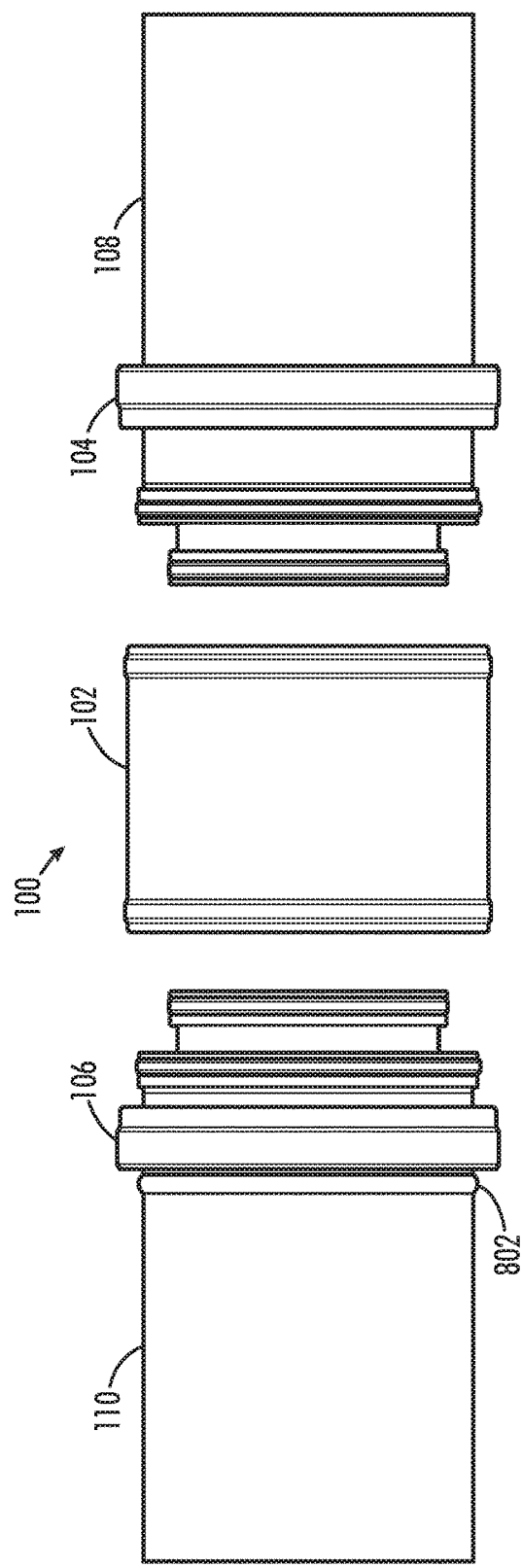

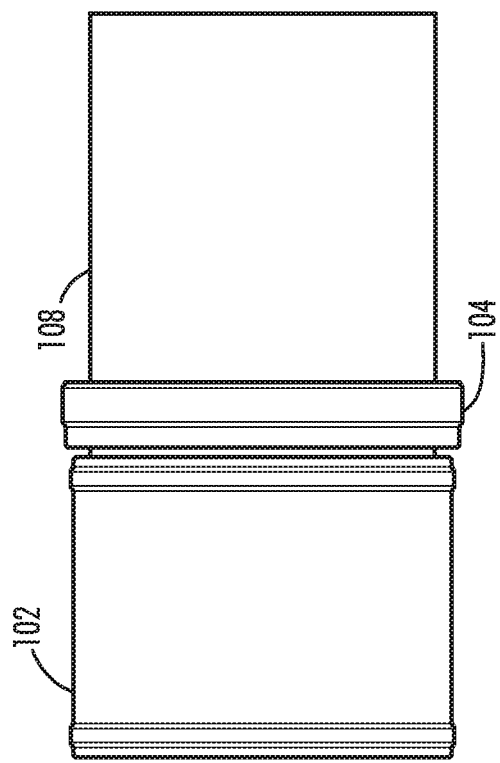
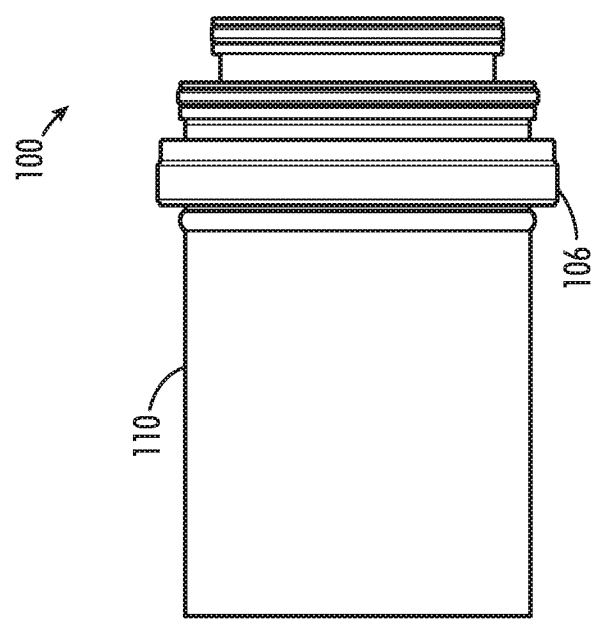
FIG. 8B

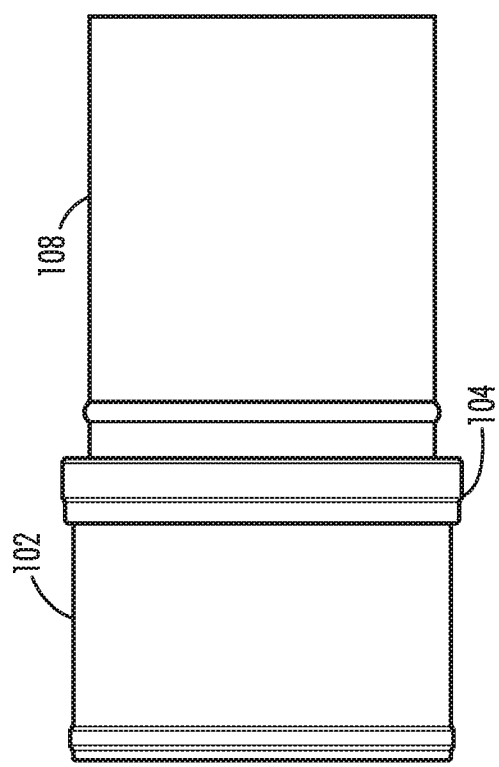
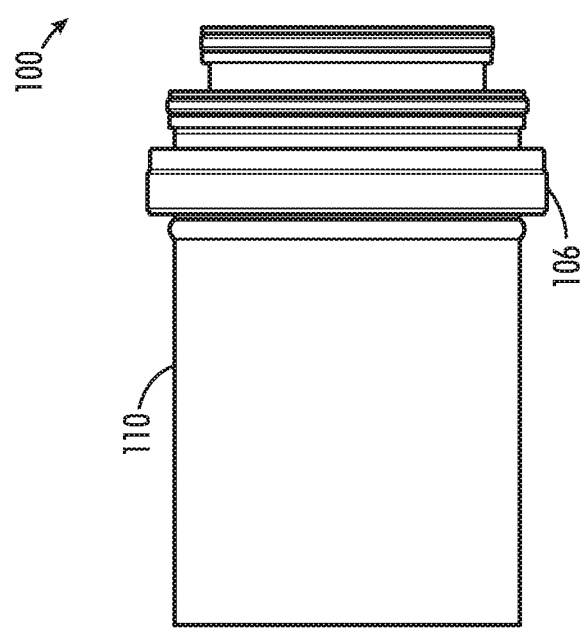
FIG. 8C

DUAL DUCT FLEXIBLE COUPLING APPARATUS AND METHODS OF USE

FIELD

The present disclosure generally relates to the field of fluid transfer. More particularly, the present disclosure relates to fluid transfer hardware.

BACKGROUND

Existing dual duct couplings typically require specially made installation tools, which must be further customized depending on the working environment in which the dual duct coupling is used. Further, special seal configurations are currently used to meet stringent performance characteristics and/or to account for the dual ducting configuration which complicates manufacture, installation, durability and maintenance of the currently used couplings.

BRIEF SUMMARY

An aspect of the disclosure relates to a flexible dual duct coupling, comprising: a coupling body having an inner flow passage and an outer flow passage therethrough; a first nut assembly configured for reversible attachment to the coupling body; and, a second nut assembly configured for reversible attachment to the coupling body, wherein the second nut assembly is opposite the first nut assembly.

In an aspect, the flexible dual duct coupling further comprises a first dual duct assembly and a second dual duct assembly wherein the coupling body comprises an internal bulkhead, disposed transverse to a longitudinal axis of the coupling body, for receipt therein of the first dual duct assembly and of the second dual duct assembly opposite the first dual duct assembly.

In an aspect, an inner flow duct and an outer flow duct of the first dual duct assembly are in fluid communication with a corresponding inner flow duct and a corresponding outer flow duct of the second dual duct assembly when the duct assemblies are inserted into the coupling body.

In an aspect, the bulkhead comprises an inner flow bulkhead tube, to allow fluid flow through the bulkhead in the inner flow duct, connected to an outer wall of the coupling body by a bulkhead face.

In an aspect, the bulkhead face is provided with at least one bulkhead port to allow fluid flow through the bulkhead in the outer flow duct.

In an aspect, the first and second nut assemblies are configured to screw onto the coupling body for reversibly coupling a first dual duct assembly and a second dual duct assembly.

In an aspect, the flexible dual duct coupling is configured to create a joint gap between the first dual duct assembly and the second dual duct assembly when the first dual duct assembly and the second dual duct assembly are inserted into the bulkhead.

In an aspect of the disclosure, the flexible dual duct coupling further comprises a ferrule disposed on an end of each of the first dual duct assembly and the second dual duct assembly wherein each ferrule is configured to fit within the coupling body.

In an aspect, the first nut assembly and the second nut assembly are configured to flexibly lock each ferrule, respectively, within the coupling body when the first nut assembly and the second nut assembly are reversibly attached to the coupling body.

In an aspect of the disclosure, the flexible dual duct coupling further comprises an inner flow duct disposed within a lumen of an outer flow duct and wherein each ferrule is tiered where an inner portion of the ferrule on the inner flow duct extends further into the coupling body than an outer portion of the ferrule on the outer flow duct.

In an aspect, the inner flow duct is configured to be in fluid communication with the inner flow passage of the coupling body when at least one of the first dual duct assembly and the second dual duct assembly are reversibly attached to the coupling body.

In an aspect, the outer flow duct is configured to be in fluid communication with the outer flow passage of the coupling body when the first dual duct assembly or the second dual duct assembly is reversibly attached to the coupling body.

In an aspect, each ferrule comprises at least one O-ring for sealing at least one of the inner flow passage and the outer flow passage.

A further aspect of the disclosure relates to a method of using a flexible dual duct coupling, comprising: placing a first nut assembly over a first ferrule of a first dual duct assembly and a second nut assembly over a second ferrule of a second dual duct assembly; sliding a coupling body over the first ferrule; mating the first nut assembly to the coupling body; attaching the first nut assembly to the coupling body, thereby flexibly and reversibly affixing the first ferrule within the coupling body; and, repeating the sliding, mating and attaching steps of the first dual duct assembly for the second dual duct assembly, to flexibly and reversibly attach the second dual duct assembly to the coupling body.

In an aspect of the disclosure, the method further comprises installing at least one O-ring on each of the first ferrule and the second ferrule prior to the sliding step.

In an aspect of the disclosure, the method further comprises restraining the first nut assembly and the second nut assembly, after the placing step, to prevent dislodgment of the first nut assembly and the second nut assembly prior to the mating step.

In an aspect of the disclosure, the method further comprises lubricating the at least one O-ring prior to the sliding step.

In an aspect, the attaching step is performed by reversibly screwing the first nut assembly and second nut assembly onto the coupling body.

A further aspect of the disclosure relates to a fluid transfer system, comprising: a first fluid reservoir; a second fluid reservoir; at least one flexible dual duct coupling, comprising, a coupling body having with an inner flow passage and an outer flow passage therethrough; a first nut assembly configured for reversible attachment to the coupling body; and, a second nut assembly configured for reversible attachment to the coupling body, wherein the second nut assembly is opposite the first nut assembly; and, dual duct assemblies operatively connecting the first and second fluid reservoirs through the at least one flexible dual duct coupling.

In an aspect, the dual duct tubing comprises shrouded fluid lines, a single run fluid supply and fluid return, or a single run dual fluid supply.

A further aspect of the disclosure relates to a clamshell dual duct coupling, comprising: a body ferrule, configured as a cap of a first dual duct assembly; a second ferrule, configured as a cap of a second dual duct assembly and for insertion into the body ferrule; and, a clamshell assembly, configured for placement around the body ferrule and the second ferrule to reversibly attach the body ferrule and the second ferrule together, wherein when the body ferrule and the second ferrule are reversibly attached by the clamshell assembly, the first dual duct assembly is in fluid communication with the second dual duct assembly.

Unless otherwise defined, all technical and/or scientific terms used herein have the same meaning as commonly understood by one of ordinary skill in the art to which the described aspects and their variations pertain. Although methods and materials similar or equivalent to those described herein can be used in the practice or testing of various aspects, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some aspects are herein described, by way of example only, with reference to the accompanying drawings. With specific reference now to the drawings in detail, it is stressed that the particulars shown are by way of example, and not necessarily to scale, and are for purposes of illustrative discussion of aspects of the disclosure. In this regard, the description taken with the drawings makes apparent to those skilled in the art how aspects of the disclosure may be practiced.

In the drawings:

FIGS. 8A-8E are progressive, side views of a flexible dual duct coupling showing the coupling of a first dual duct assembly and a second dual duct assembly using a flexible dual duct coupling, according to aspects of the present disclosure;

DETAILED DESCRIPTION

Figure 1:
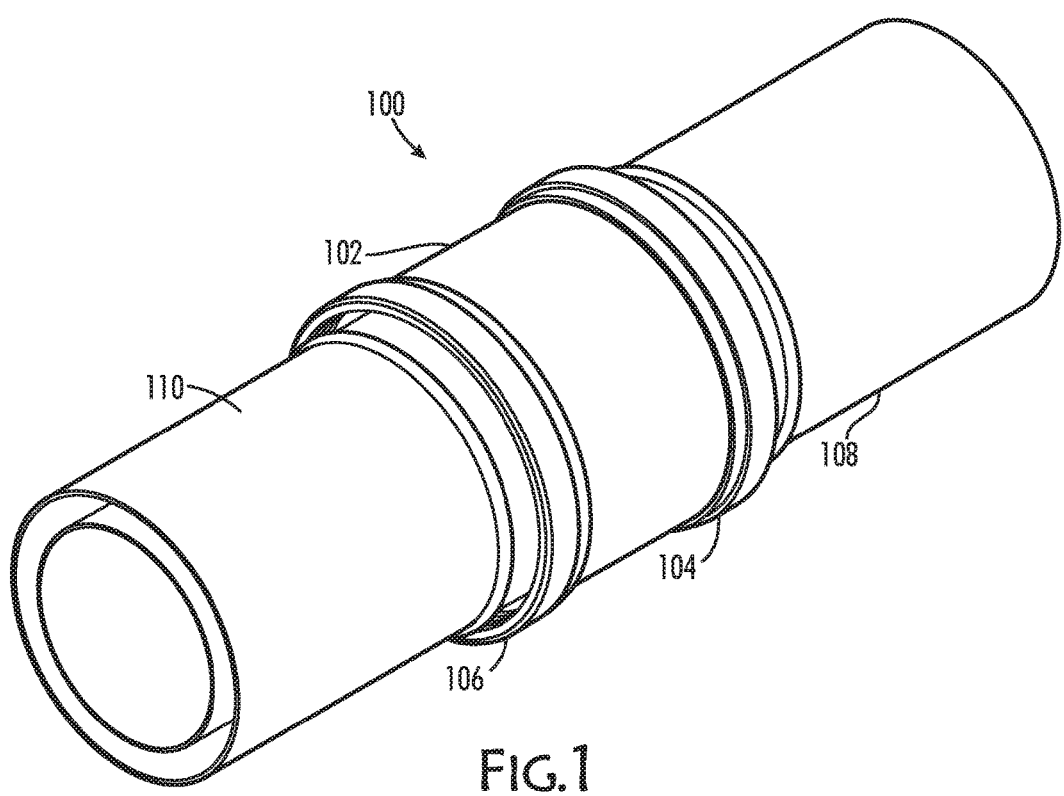
FIG. 1 is a perspective view of a flexible dual duct coupling connected to a first dual duct assembly and a second dual duct assembly, according to aspects of the present disclosure.

The present disclosure generally relates to the field of fluid transfer. More particularly, the present disclosure relates to fluid transfer hardware.

Before explaining at least one aspect of the disclosure in detail, it is to be understood that the aspects described herein are not limited to the details of construction and/or the arrangement of the components and/or methods set forth in the following description and/or illustrated in the drawings. Aspects of the disclosure are capable of being practiced or carried out in various other ways.

Generally, a dual duct coupling is described which is configured to reversibly attach, or couple, dual duct tubing (sometimes referred to "dual duct assemblies" herein), for example where an inner flow duct is encircled by an outer flow duct wherein the inner flow duct is disposed within the lumen of the outer flow duct, such that both ducts of each side of the dual duct tubing that is being coupled are in sealed, fluid communication, respectively. The coupling is configured for use in fluid transfer systems, for example in fluid transfer systems that use shrouded fluid lines, in single run fluid supply and fluid return transfer systems, and in single run dual fluid supply fluid transfer systems. It is understood in the relevant industries that shrouded fluid lines include an inner flow duct, in which there is fluid flow, and an outer shroud or layer around the inner flow duct that acts, for example, to provide protection and/or insulation. In some aspects of the disclosure, a single run fluid supply and fluid return transfer system is where fluid is transferred in one direction as a supply within one of the inner or outer ducts, and fluid is returned in the opposite direction in the other duct not used for the supply. In some aspects of the disclosure, in single run dual fluid supply fluid transfer systems both the inner and outer ducts are used as supply, or both are used as a return, optionally for different fluids.

The attachment is configured to be reversible in that the two dual duct assemblies can be attached to and then detached from each other, as needed and/or as circumstances dictate. In some aspects, the dual ducting is adapted to convey fluid through an inner flow duct and/or through an outer flow duct, and the coupling is configured to permit flow in both the inner and outer flow ducts while also acting as attachment hardware. In some aspects, a single coupling provides the fluid connection between two dual duct assemblies comprising a pair of concentric ducts manufactured to a common ferrule. It is conceived that the common ferrule on each dual duct assembly will provide additional fluid sealing capabilities with O-rings.

In an aspect of the disclosure, the dual duct couplings described herein simplify the assembly process of joining two mating dual wall duct assemblies by reducing part count, required seal installation tooling, time for installation, and complexity of the fluid joint. The part reduction over the previous solutions is from four (two sleeves and two couplings) to three (coupling body, two nut assemblies, shown and described with respect to FIGS. 1-6C) or two (body ferrule, clamshell assembly, shown and described with respect to FIGS. 9A-10). The dual duct coupling designs described herein also eliminate the need, over previous solutions, for special installation tools to assemble each fluid joint. In some aspects of the disclosure, the dual duct couplings described herein also eliminate the need for special seal designs by allowing use of conventional O-ring type seals. Further, the dual duct couplings described herein provide additional shear strength capabilities for critical installations, for example by having a coupling body design and/or body nut cross-sectional shapes which better utilize the available space to increase the strength attributes of the coupling.

Referring now to the drawings, FIG. 1 is a perspective view of a flexible dual duct coupling 100 connected to a first dual duct assembly 108 and a second dual duct assembly 110, according to aspects of the present disclosure. In some aspects of the disclosure, the flexible dual duct coupling 100 comprises a coupling body 102, a first nut assembly 104 and a second nut assembly 106. The flexible dual duct coupling 100 is configured such that the second nut assembly is disposed on the opposite side of the coupling body 102 as the first nut assembly 104. The first and second nut assemblies 104, 106 are configured to reversibly attach to the coupling body 102, for example by screwing, compression fit, snap-lock or the like. As described elsewhere herein, the first nut assembly 104 reversibly attaches the first dual duct assembly 108 to the coupling body 102 and the second nut assembly 106 reversibly attaches the second dual duct assembly 110 to the coupling body 102, wherein the first dual duct assembly 108 and the second dual duct assembly 110 are used for transferring at least one fluid through at least one duct. In some aspects of the disclosure, the flexible dual duct coupling 100 is substantially cylindrical and/or corresponds to the general shape of the dual duct assemblies 108, 110.

In some aspects, the dual duct couplings described herein are designed to function at a nominal pressure of 125 psi, at a proof pressure of 250 psi and exhibit a burst pressure of 375 psi, or in some aspects −12 in Hg. In some aspects, the dual duct couplings described herein are designed to operate at temperatures ranging from −70° F. to 200° F. In some aspects of the disclosure, the dual duct couplings described herein maintain electrostatic conductivity across the coupling. In some aspects, the dual duct couplings described herein are used for duct sizes ranging from 0.50" OD inner to 6.00" OD outer, or −08 through −96 in industry understood duct sizes. It should be understood that performance characteristics described herein are by way of example only and are not intended to exclude coupling configurations adapted to operation outside the disclosed exemplary ranges.

Figure 2:
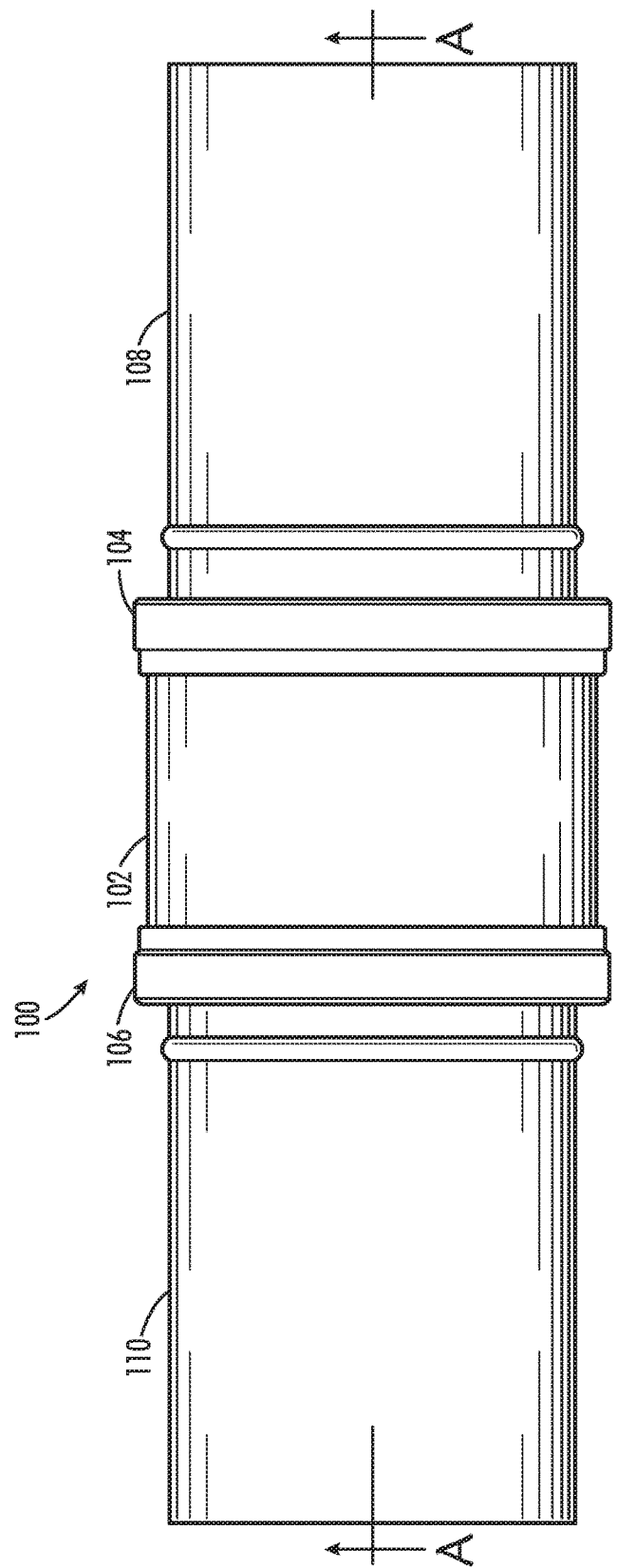
FIG. 2 is a side view of a flexible dual duct coupling connected to a first dual duct assembly and a second dual duct assembly, according to aspects of the present disclosure.

FIG. 2 is a side view of a flexible dual duct coupling 100 connected to a first dual duct assembly 108 and a second dual duct assembly 110, according to aspects of the present disclosure.

Figure 3:
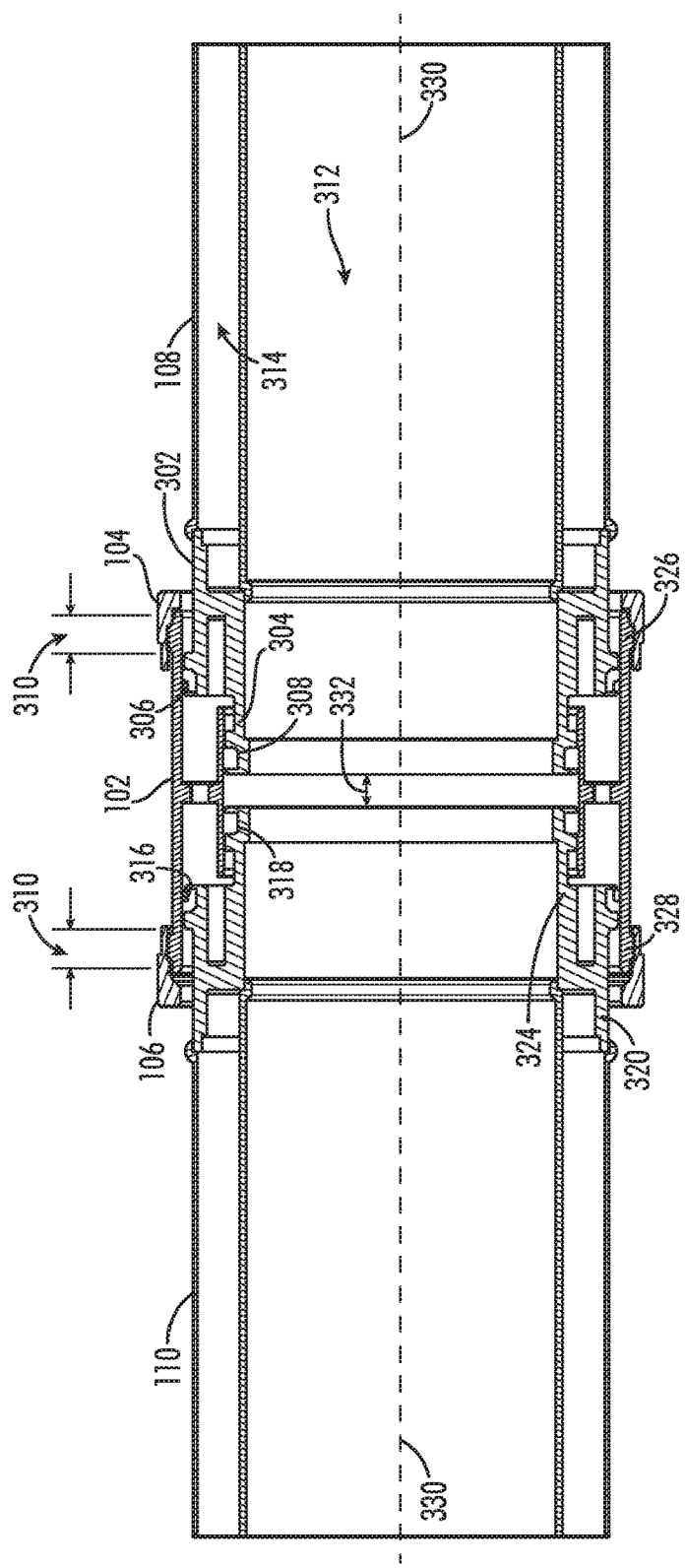
FIG. 3 is a cross-sectional view A-A of a flexible dual duct coupling of FIG. 2 connected to a first dual duct assembly and a second dual duct assembly, according to aspects of the present disclosure.

FIG. 3 is a cross-sectional view along A-A of the flexible dual duct coupling 100 of FIG. 2, where the first dual duct assembly 108 and the second dual duct assembly 110 are reversibly connected to the flexible dual duct coupling 100, according to aspects of the present disclosure. In some aspects of the disclosure, in an attached or coupled configuration, the first dual duct assembly 108 is inserted into the coupling body 102 and the first nut assembly 104 is reversibly tightened to the coupling body 102, trapping the first dual duct assembly 108 within the coupling body 102. The second dual duct assembly 110 is similarly attached to the coupling body 102 by the second nut assembly 106.

In an aspect of the disclosure, a first ferrule of the first dual duct assembly 108 is configured with a first outer ferrule portion 302 and a first inner ferrule portion 304. Similarly, a second ferrule of the second dual duct assembly is configured with a second outer ferrule portion 320 and a second inner ferrule portion 324. When attached, a first inner ferrule portion 304 of the first dual duct assembly 108 is inserted into an inner flow bulkhead tube 606 (described in more detail with respect to FIGS. 6B-6C) and a first outer ferrule portion 302 of the first dual duct assembly 108 is inserted into an outer flow bulkhead tube 608, creating a sealed inner flow duct 312 extending from an inner lumen of the first dual duct assembly 108 through the coupling body 102 to the second dual duct assembly 110 and a sealed outer flow duct 314 extending from an outer passage of the first dual duct assembly 108 through the coupling body 102 to an outer passage of the second dual duct assembly 110. In some aspects, the ferrule portions 302, 304 of the first duct assembly are tiered (as shown in more detail in FIGS. 4 and 5), such that the portion 304 of the ferrule on the inner flow duct 312 extends further into the coupling body 102 than the portion 302 of the ferrule on the outer flow duct 314. In some aspects of the disclosure, the dual duct assemblies 108, 110 are maintained in alignment at least partially by at least one ferrule, for example a first outer ferrule portion 302 and/or a first inner ferrule 304 (and corresponding outer and inner ferrule portions 320, 324 located on the second dual duct assembly 110) acting in cooperation with the coupling body 102, such that angular movement away from alignment with the longitudinal axis 330 is substantially prevented.

In an aspect of the disclosure, the flexible dual duct coupling 100 is configured to create a joint gap 332 between the dual duct assemblies 108, 110, to allow a range of relative motion 310 between them, after being coupled together by the flexible dual duct coupling 100, or in other words, the dual duct assemblies 108, 110 are flexibly locked into the coupling body 102 by the first and second nut assemblies 104, 106. In some aspects of the disclosure, the provision of a joint gap 332 allows for axial movement as well as some limited angular changes of adjoining duct assemblies. The axial movement can be varied to provide a typical gap as defined by couplings like AS1650, AS1710, AS1730, and AS5830. In some aspects, as the axial movement is increased the angular misalignment is decreased. The axial and angular movement is typically defined to account for manufacturing and/or installation tolerances and/or to allow some operational movement.

In an aspect of the disclosure, fluidic sealing of the dual duct assemblies 108, 110 with respect to the flexible dual duct coupling 100 is facilitated by seals, for example O-rings 306, 308, 316, 318 wherein in some aspects of the disclosure there is at least one O-ring for each ferrule portion 302, 304, 320, 324. In an aspect of the disclosure, the O-rings are of commercially available sizes. The corollary being that the ferrule portions 302, 304, 320, 324 are configured to be of standard commercial sizes themselves. In some aspects of the disclosure, the O-rings used are at least partly compliant with SAE AS568.

In an aspect of the disclosure, a first nut stopper 326 and a second nut stopper 328 are provided to the coupling body 102 to reversibly secure the first nut assembly 104 and the second nut assembly, respectively, thereto. For example, the first nut stopper 326 and the second nut stopper 328 are provided with threading onto which the first nut assembly 104 and the second nut assembly 106 reversibly screw. In an aspect of the disclosure, the first nut stopper 326 and the second nut stopper 328 are configured as lips, over which the first nut assembly 104 and the second nut assembly 106 reversibly snap.

In some aspects of the disclosure, at least one locking and/or bonding spring is provided to each side of the dual duct coupling 100 between the coupling body 102 and each nut assembly 104, 106 and/or around the outer ferrule portions 302, 320 and/or inner ferrule portions 304, 324.

Figure 4:
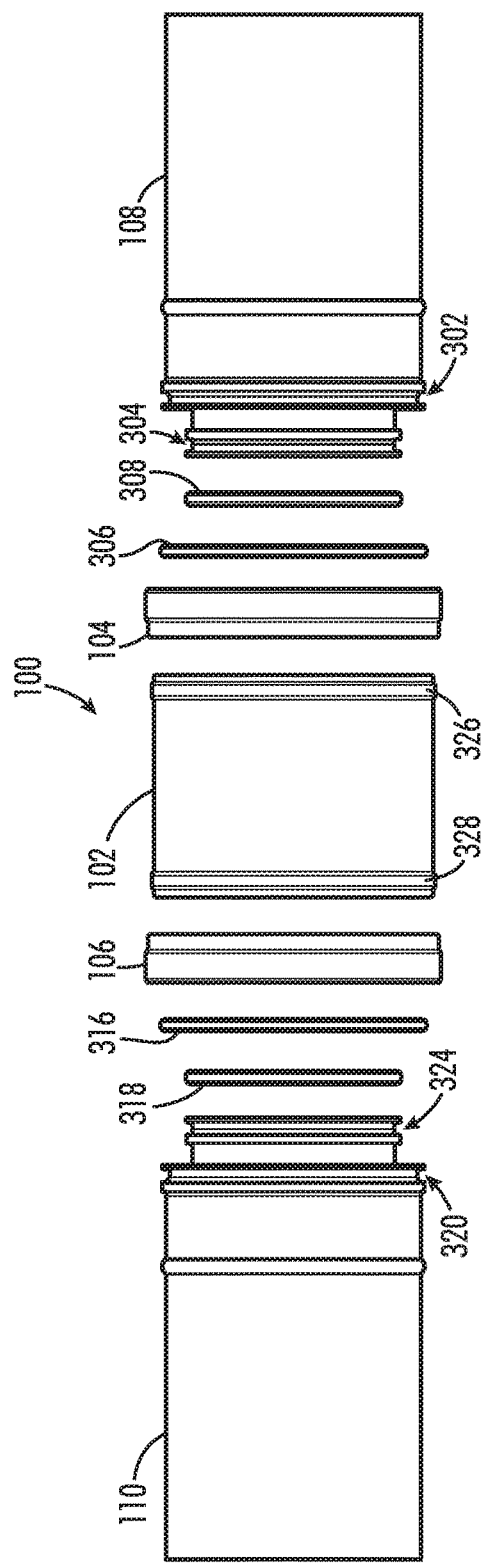
FIG. 4 is an exploded, side view of a flexible dual duct coupling with a first dual duct assembly and a second dual duct assembly, according to aspects of the present disclosure.

FIG. 4 is an exploded, side view of a flexible dual duct coupling 100 with a first dual duct assembly 108 and a second dual duct assembly 110, according to aspects of the present disclosure. The tiered configuration of the dual duct assembly 108, 110 ferrules is clearly shown in FIG. 4, where the inner ferrule portions 304, 324 are shown extending farther along the longitudinal axis 330 than the outer ferrule portions 302, 320.

Figure 5:
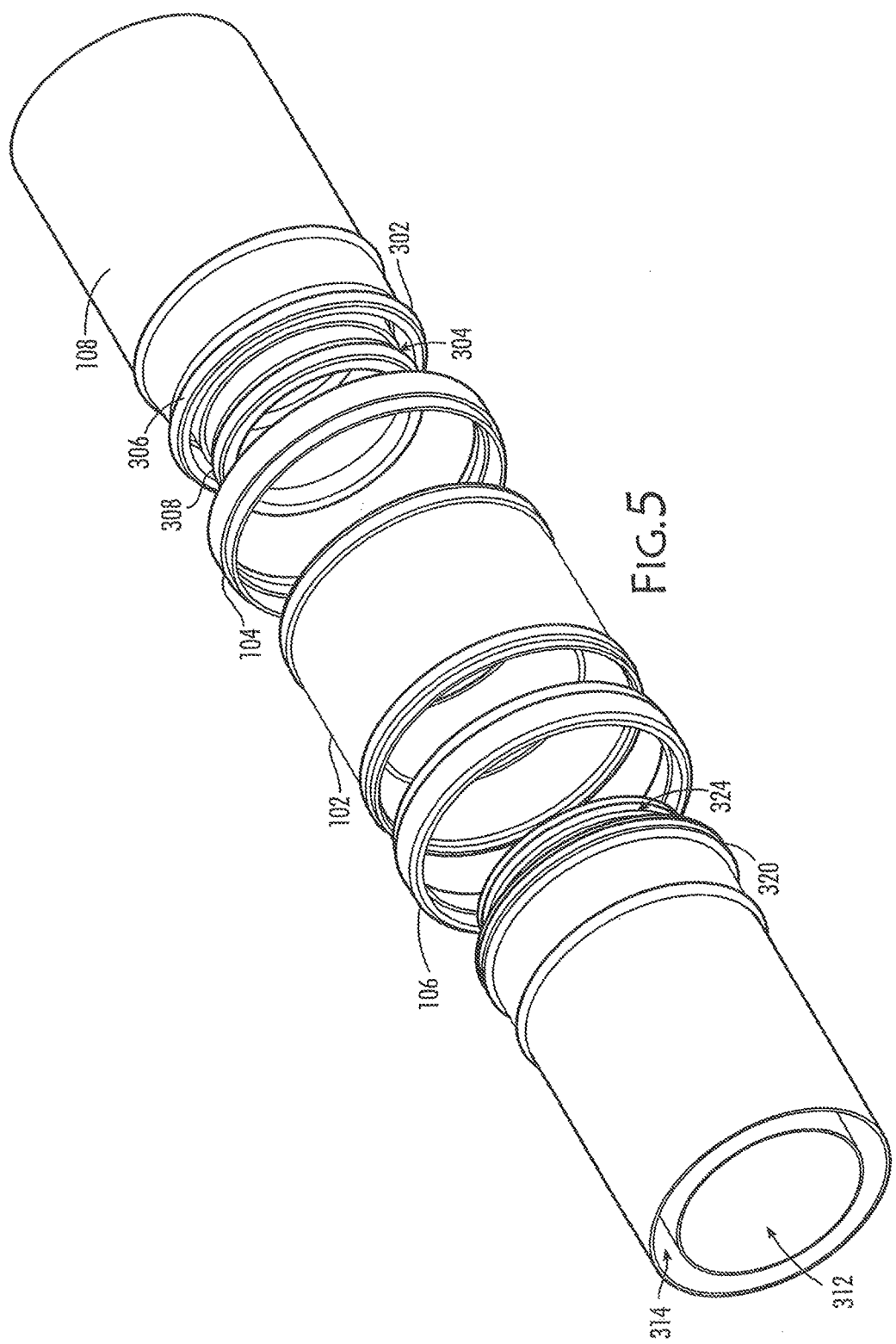
FIG. 5 is a partially exploded, perspective view of a flexible dual duct coupling with a first dual duct assembly and a second dual duct assembly, according to aspects of the present disclosure.

FIG. 5 is a partially exploded, perspective view of a flexible dual duct coupling 100 with a first dual duct assembly 108 and a second dual duct assembly 110, according to aspects of the present disclosure. The inner flow duct 312 and the outer flow duct 314 are shown, in an aspect of the disclosure.

Figure 6A:
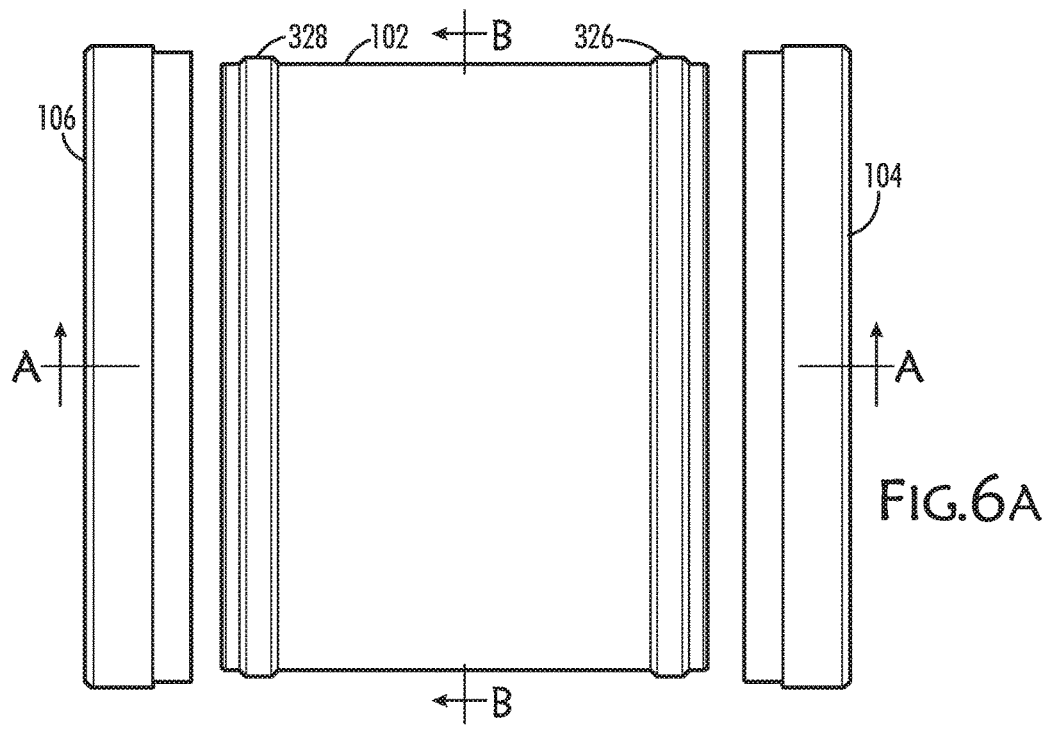
FIGS. 6A-6C are a side view of a flexible dual duct coupling, a cross sectional view A-A of the flexible dual duct coupling of FIG. 6A; and, a cross sectional view B-B of the flexible dual duct coupling of FIG. 6A, according to aspects of the present disclosure.

FIG. 6A is a side view of a flexible dual duct coupling 100, including a coupling body 102, a first nut assembly 104 and a second nut assembly 106. A cross-section A-A of the coupling body 102 is shown in FIG. 6B and a cross-section B-B of the coupling body 102 is shown in FIG. 6C, in some aspects of the disclosure.

Figure 6B:
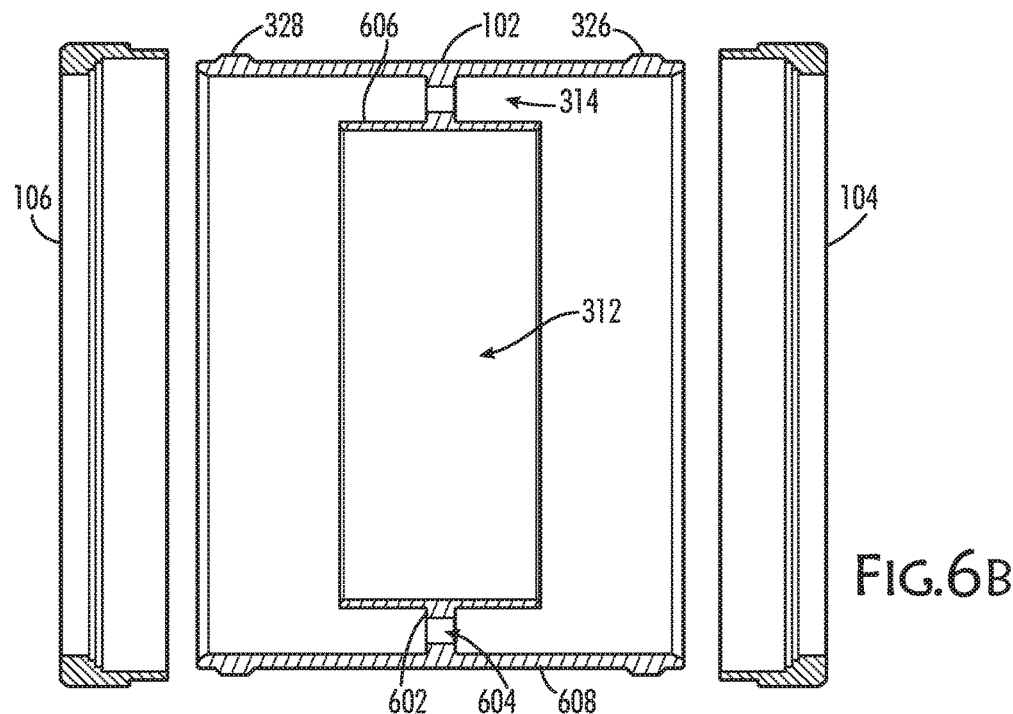

FIG. 6B is a cross-sectional view of the flexible dual duct coupling 100 along A-A, in an aspect of the disclosure. The coupling body 102 is configured with an inner flow bulkhead tube 606, through which flow from the inner flow duct 312 from the first and second dual duct assemblies 108, 110 passes and into which the inner ferrule portions 304, 324 of the first dual duct assembly 108 and the second dual duct assembly 110, respectively, are inserted when coupled by the dual duct coupling 100.

Positioned around the circumference of the inner flow bulkhead tube 606 is the outer flow bulkhead tube 608, through which flow from the outer duct 314 from the first and second dual duct assemblies 108, 110 can pass.

Figure 6C:
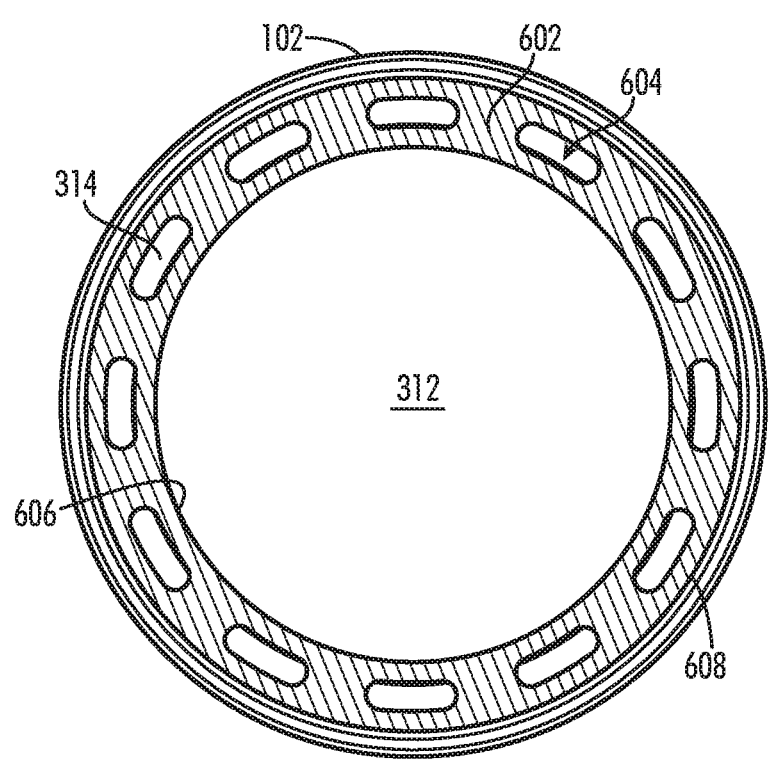

FIG. 6C is a cross-sectional view of the flexible dual duct coupling 100 along B-B, in an aspect of the disclosure. In an aspect of the disclosure, the inner flow bulkhead tube 606 is attached to the coupling body 102 by a bulkhead face 602, configured with at least one bulkhead port 604 to permit fluid flow in the outer flow duct 314. In an aspect of the disclosure, the outer flow duct 314 is defined in this dimension by the space between the inner flow bulkhead tube 606 and the outer flow bulkhead tube 608. It can be seen that the inner flow duct 312 is defined by the inner flow bulkhead tube 606, in some aspects of the disclosure.

Figure 7:
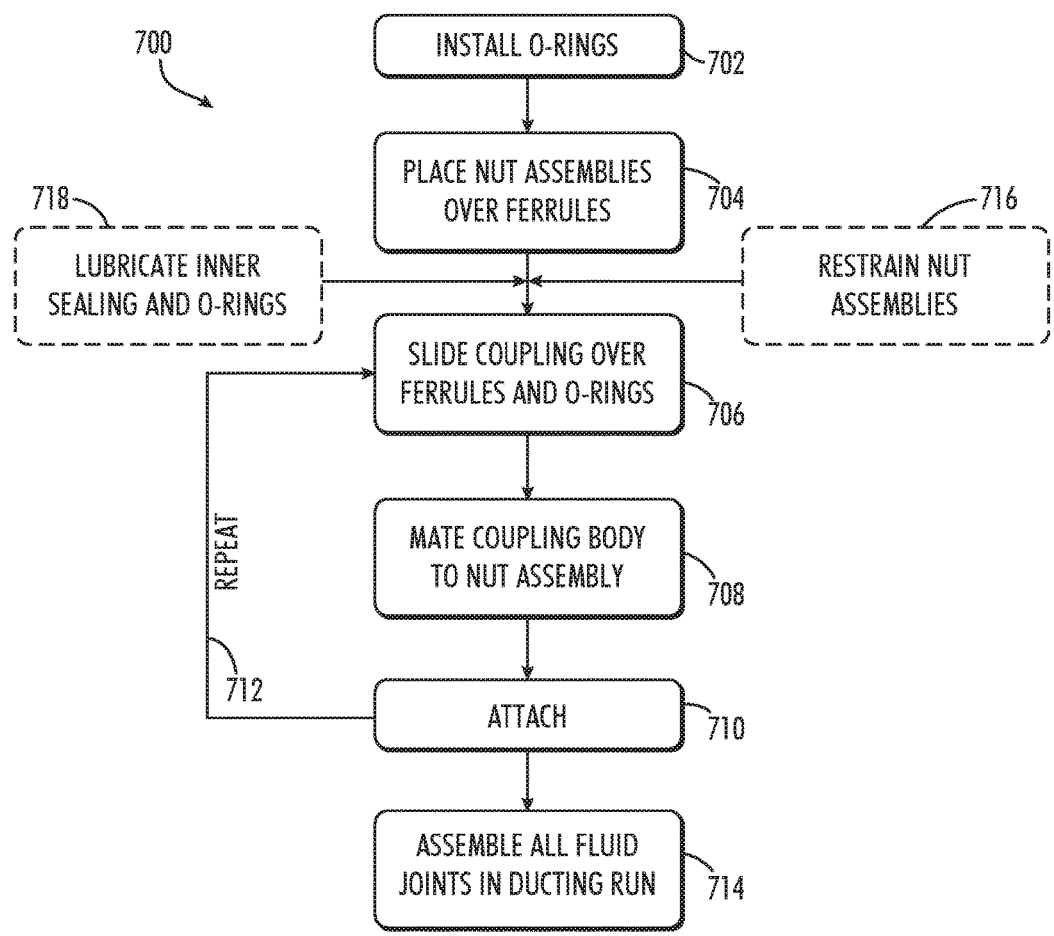
FIG. 7 is a flowchart of a method of using a flexible dual duct coupling, according to aspects of the present disclosure.
Figure 8D:
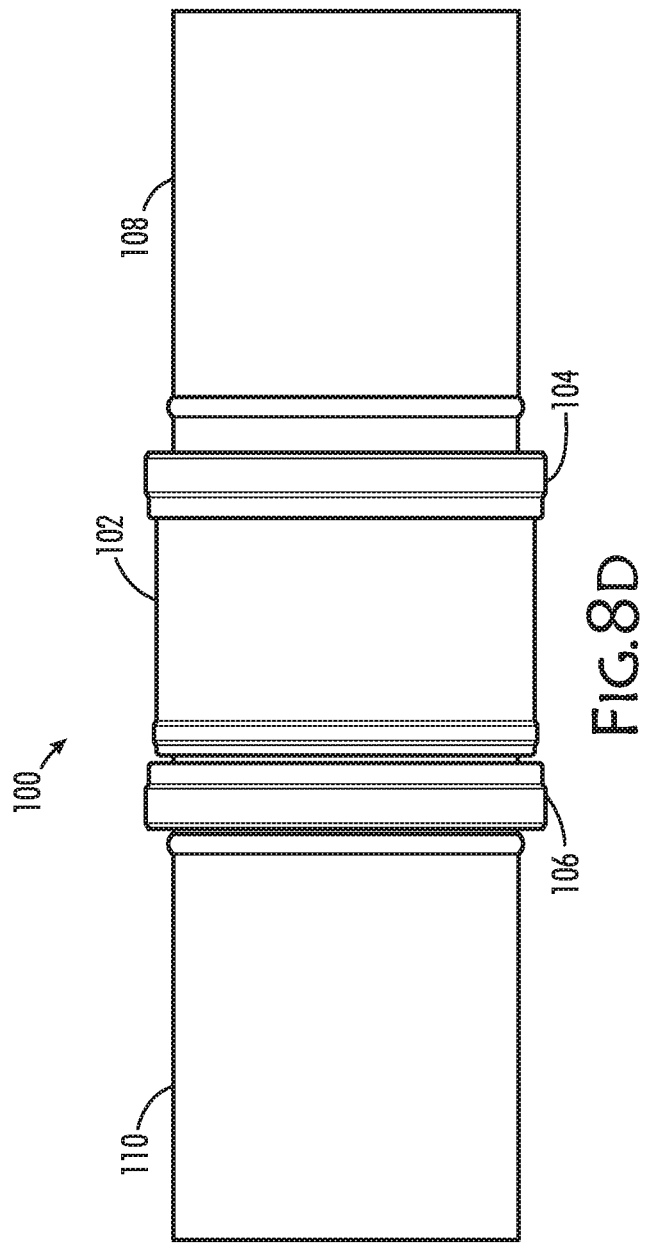

FIG. 7 is a flowchart 700 of a method of using the flexible dual duct coupling 100, according to aspects of the present disclosure. For efficiency, description of device configurations during use (FIGS. 8A-8E) are described in conjunction with the methods of their use described with respect to FIG. 7. As described elsewhere herein, O-rings 306, 308, 316, 318 are used in some aspects to provide sealing between the dual duct assemblies 108, 110 and the dual duct coupling 100. In an aspect, the O-rings are installed (702) on their respective ferrule portions 302, 304, 320, 324 prior to attachment of the dual duct assemblies 108, 110 to the dual duct coupling 100. In an aspect, the first nut assembly 104 is placed (704) over the ferrule portions 302, 304 of the first dual duct assembly 104 (wherein the ferrule portions 302, 304 are inserted through the first nut assembly 104) and a similar operation is performed for the second dual duct assembly 110 and its corresponding ferrule portions 320, 324 and second nut assembly 106, such as shown in the configuration of FIG. 8A. Optionally, the nut assemblies 104, 106 are restrained (716) to keep them out of the way until the coupling body 102 is slid (706) over their respective ferrules and O-rings. Restraining (716) is optionally performed manually or by temporarily wedging the nut assemblies 104, 106 against a raised weld bead 802 (which is also present on the first dual duct assembly 108, but is hidden in FIG. 8A by the first nut assembly 104). In some aspects of the disclosure, at least the O-rings 306, 308, 316, 318 are lubricated (718) to facilitate the sliding (706) and/or to enhance their sealing effect and/or to help preserve the O-rings.

Figure 8E:
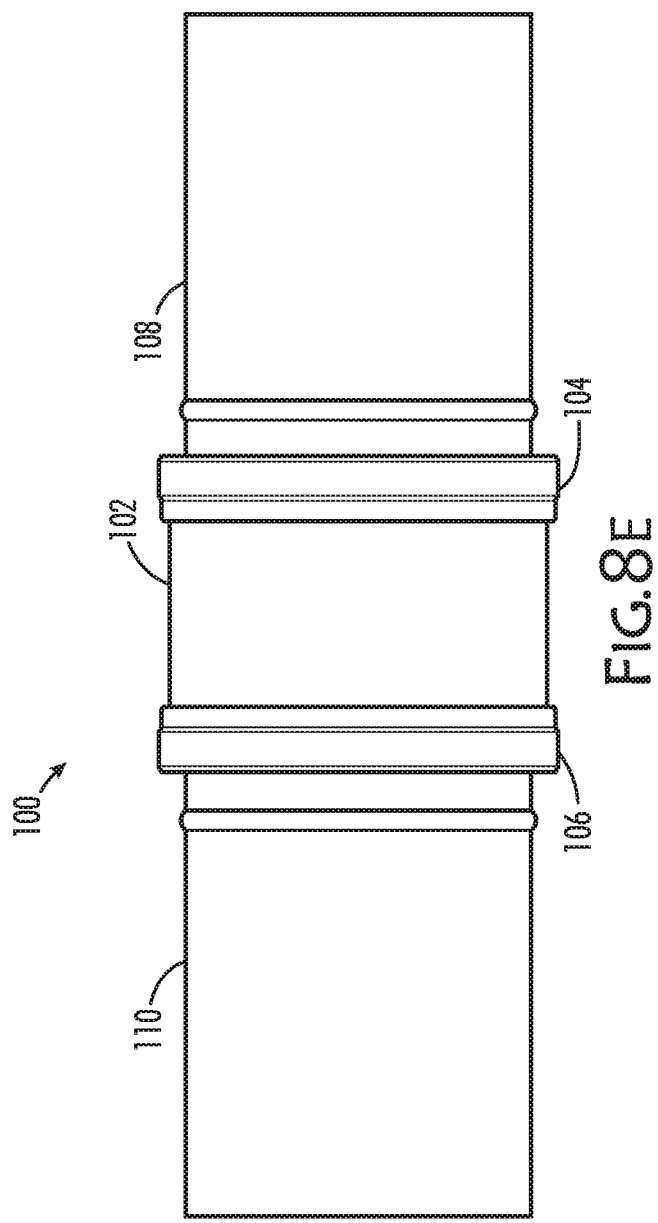

FIG. 8B shows the coupling body 102 slid (706) over the ferrule portions 302, 304 of the first dual duct assembly 108. In an aspect of the disclosure, the first nut assembly 104 is mated (708) to the coupling body 102 and tightened to the coupling body 102 to attach (710) the first dual duct assembly 108 to the dual duct coupling 100, as shown in FIG. 8C, thereby removably affixing the first ferrule. In some aspects, the sliding (706), shown in FIG. 8D, mating (708) and attaching (708), shown in FIG. 8E, are repeated (712) for the second dual duct assembly 110 and the corresponding ferrule portions 320, 324, O-rings 316, 318 and second nut assembly 106. In some aspects of the disclosure, the dual duct assemblies 108, 110 are removable from the flexible dual duct coupling 100 by detaching the first and second nut assemblies 104, 106 from the coupling body 102, for example by unscrewing them.

Figure 9A:
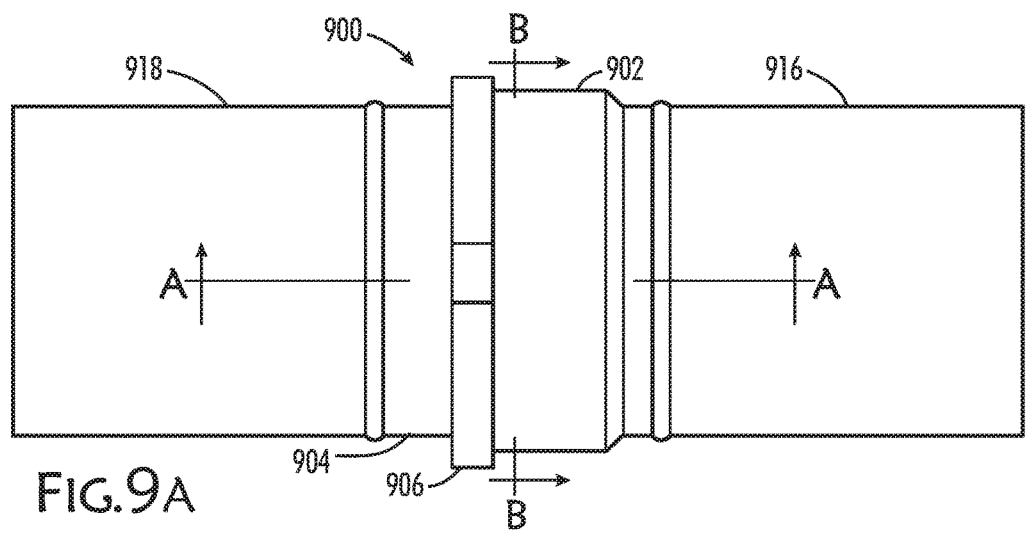
FIG. 9A is a side view of a clamshell dual duct coupling connected to a first dual duct assembly and a second dual duct assembly, according to aspects of the present disclosure.
Figure 9B:
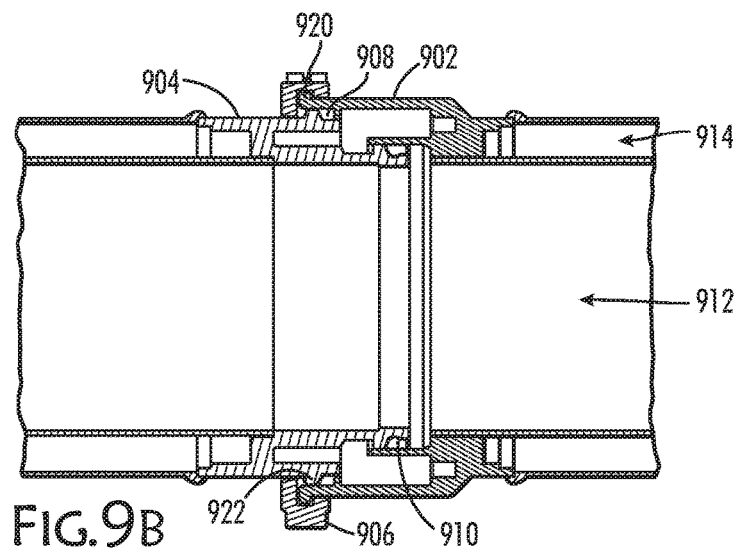
FIG. 9B is a cross-sectional view A-A of the clamshell dual duct coupling of FIG. 9A connected to a first dual duct assembly and a second dual duct assembly, according to aspects of the present disclosure.

FIG. 9A is a side view of a clamshell dual duct coupling 900 comprising a body ferrule 902 connected to a first dual duct assembly 916 and a second ferrule 904 connected to a second dual duct assembly 918, according to aspects of the present disclosure. In some aspects of the disclosure, the clamshell dual duct coupling is configured as a flexible fluid joint that allows at least some axial and angular motion as the fluid industry has defined a flexible coupling. For example, the clamshell dual duct coupling 900 exhibits at least 50% of the flexibility of the industry recognized "flexible" design standard, called a "half flex". In some aspects, the first dual duct assembly 916 is capped by a body ferrule 902 configured for receipt therein of a second ferrule 904 of the second dual duct assembly 918 (the corollary being that the second ferrule 904 is configured for insertion into the body ferrule 902). FIG. 9B is a cross-sectional view A-A of the clamshell dual duct coupling 900 of FIG. 9A showing in more detail the second dual duct assembly 918 inserted into, and reversibly attached to, the first dual duct assembly 916, according to aspects of the disclosure. In an aspect of the disclosure, the enclosing body ferrule 902 design eliminates a set of O-rings, such as found in other designs where two dual duct assemblies are coupled together, eliminating two possible leak paths and/or potential failure points.

In some aspects of the disclosure, a reversibly locking clamshell assembly 906 is placed around a leading edge of the body ferrule 902 and the second ferrule 904 to reversibly attach the dual duct assemblies 916, 918 together. In an aspect of the disclosure, the first dual duct assembly 916 and the second dual duct assembly 918 are maintained in fluid communication with one another when attached together by the clamshell assembly 906 (and/or when the second ferrule 904 is inserted into the body ferrule 901). In some aspects of the disclosure, the clamshell assembly 906 is hinged. The leading edge of the body ferrule 902 is provided with a lip 920 over which the clamshell assembly 906 is placed thereby maintaining the clamshell assembly 906 and the first dual duct assembly in a fixed relationship, in an aspect of the disclosure. In some aspects of the disclosure, the second ferrule 904 is provided with a ridge 922 which, when the second dual duct assembly 918 is inserted into the body ferrule 902 and the clamshell assembly 906 is placed over the lip 920, prevents the second dual duct assembly 918 from being retracted from the first dual duct assembly 916, thereby maintaining a stable relationship between the dual duct assemblies 916, 918.

In an aspect of the disclosure, the second ferrule 904 of the second dual duct assembly 918 is configured with at least one O-ring 908, 910 for fluidicly sealing an inner flow duct 912 and/or an outer flow duct 914 when the first and second dual duct assemblies 916, 918 are coupled together. In some aspects, the coupling between body ferrule 902 (of the first dual duct assembly 916) and the second ferrule 904 (of the second dual duct assembly 918) which forms the inner flow duct 912 is swaged, optionally eliminating inner flow duct welding for all sizes of ducting.

In an aspect of the disclosure, the coupling forming the outer flow duct 914, for example at the lip 920 and ridge 922 is welded or swaged. In an aspect of the disclosure, this ferrule combination is a 'one way' assembly and in some operational situations may be more desirable than reversible configurations, such as described elsewhere herein. The coupling body 102 of FIGS. 1-8E is replaced by the body ferrule 902, in an aspect of the disclosure.

Figure 10:
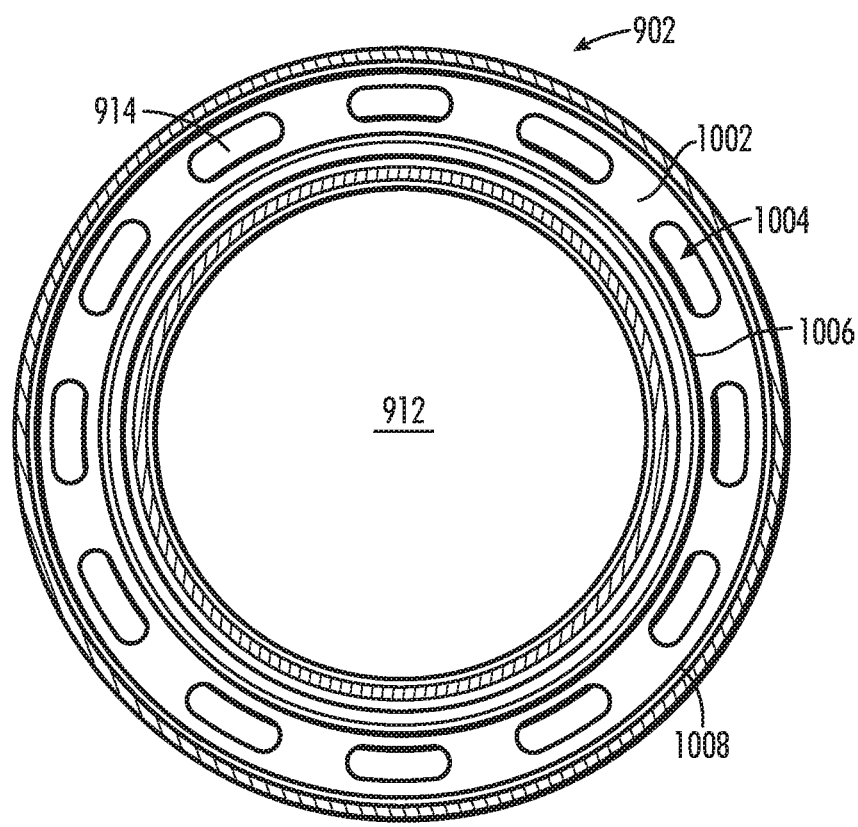
FIG. 10 is a cross-sectional view B-B of the body ferrule of the clamshell dual duct coupling of FIG. 9A, according to aspects of the present disclosure; and, FIG. 11 is a block diagram of a fluid transfer system using a flexible dual duct coupling, according to aspects of the present disclosure.

FIG. 10 is a cross-sectional view B-B of the body ferrule 902 of the clamshell dual duct coupling 900 of FIG. 9A, according to aspects of the present disclosure. In an aspect, the body ferrule 902 is configured similarly to the flexible dual duct coupling 100 wherein the inner flow duct 912 is disposed in a lumen of the body ferrule 902 and the outer flow duct 914 passes through at least one port 1004 located in a face 1002 connected an inner flow bulkhead wall 1006 to the exterior surface 1008 of the body ferrule 902.

Figure 11:
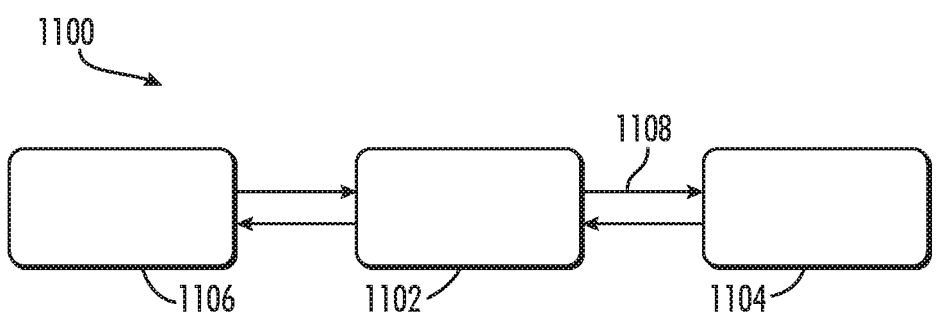

FIG. 11 is a block diagram of a fluid transfer system 1100 using a dual duct coupling 1102, such as those described herein 100, 900, according to aspects of the present disclosure. In an aspect of the disclosure, fluid is transferred from a first reservoir 1104 to a second reservoir 1106, through dual-walled ducting 1108 (such as described herein with respect to the first dual duct assemblies 108, 916 and the second dual duct assemblies 110, 918) leading from each reservoir 1104, 1106 and coupled together by the dual duct coupling 1102. The dual duct coupling 1102 is configured for use in different types of fluid transfer systems, for example in fluid transfer systems that use shrouded fluid lines, in single run supply and return fluid transfer systems and in single run dual fluid supply fluid transfer systems.

In certain fluid transfer system configurations, the inner flow ducts 312, 912 described herein function as fluid supply ducts, where the outer flow ducts 314, 914 function as fluid return ducts. In certain fluid transfer system configurations, the outer flow ducts 314, 914 remain vacated, the outer wall merely functioning as a shroud to the inner flow ducts 312, 912. In certain fluid transfer system configurations, both the inner flow ducts 312, 912 and the outer flow ducts 314, 914 function as fluid supply ducts.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various aspects may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Further, described ranges are intended to include numbers outside any range described within statistical error and/or inherent measurement equipment limitations.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate aspects, may also be provided in combination in a single aspect. Conversely, various features of the disclosure, which are, for brevity, described in the context of a single aspect, may also be provided separately or in any suitable subcombination or as suitable in any other described aspect of the disclosure. Certain features described in the context of various aspects are not to be considered essential features of those aspects, unless the aspect is inoperative without those elements.

Although the disclosure has been described in the context of specific aspects thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A clamshell dual duct coupling, comprising:
a body ferrule, configured as a cap of a first dual duct assembly;

a second ferrule, configured as a cap of a second dual duct assembly and for insertion into the body ferrule; and, a clamshell assembly, configured for placement around the body ferrule and the second ferrule to reversibly attach the body ferrule and the second ferrule together, wherein when the body ferrule and the second ferrule are reversibly attached by the clamshell assembly, the first dual duct assembly is in fluid communication with the second dual duct assembly;

wherein the clamshell assembly is axially offset along the first and second dual duct assemblies from a leading end of one of the first and second dual duct assemblies.

\* \* \* \* \*